United States Patent [19]

Feres

[11] Patent Number: 4,683,026
[45] Date of Patent: Jul. 28, 1987

[54] THIN LAYER EVAPORATOR

[76] Inventor: Vaclav Feres, Haid- und Neu-Str. 14, D-7500 Karlsruhe 1, Fed. Rep. of Germany

[21] Appl. No.: 732,166

[22] Filed: May 8, 1985

[30] Foreign Application Priority Data

May 22, 1984 [DE] Fed. Rep. of Germany ....... 3418982

[51] Int. Cl.$^4$ .............................................. B01D 1/22
[52] U.S. Cl. .................... 159/6.1; 159/13.1; 159/49; 159/DIG. 41; 202/235; 202/236; 203/89; 165/88
[58] Field of Search ..................... 203/89; 159/6.1, 49, 159/13.1, DIG. 41; 202/245, 242, 235, 236; 165/88; 122/39

[56] References Cited

U.S. PATENT DOCUMENTS

| | | | |
|---|---|---|---|
| 2,192,089 | 2/1940 | Long | 159/6.1 |
| 2,313,175 | 3/1943 | Scott et al. | 159/6.1 |
| 2,408,639 | 10/1946 | Hickman | 159/6.1 |
| 2,551,815 | 5/1951 | Schulz | 159/6.1 |
| 2,606,146 | 8/1952 | Lutten Jr. | 159/6.1 |
| 2,894,879 | 7/1959 | Hickman | 159/6.1 |
| 2,927,634 | 3/1960 | Gudheim | 159/6.1 |
| 3,221,807 | 8/1965 | Johansson | 159/6.1 |
| 3,486,743 | 12/1969 | Todd | 159/6.1 |

FOREIGN PATENT DOCUMENTS 0002568  6/1979  European Pat. Off. ............. 159/6.1

OTHER PUBLICATIONS

The Alfa Laval, "Evaporation Plant Centri-Therm Model CT6", Publication No. PD 60101E.

Primary Examiner—S. Leon Bashore
Assistant Examiner—V. Manoharan
Attorney, Agent, or Firm—McCormick, Paulding and Huber

[57] ABSTRACT

A thin layer evaporator comprises a container forming a body, a container cover on the one side, a drive shaft projecting into the container from the opposite side, a rotor fixed to the drive shaft and which has one or more conically outwardly widening evaporator areas and whose evaporator chamber is connected to the body, as well as a heating chamber separated from the body. The starting product is fed to the inner periphery of the evaporator areas, spreads outwards therefrom in a thin film and the concentrate is removed on the outer periphery by means of a draw-off pipe. In order to be able to absorb dynamic forces in a vibration free manner, the drive shaft is partly constructed as a hollow shaft and is mounted on a fixed spindle projecting into the container and rotor.

2 Claims, 3 Drawing Figures

THIN LAYER EVAPORATOR

BACKGROUND OF THE INVENTION

The present invention relates to a thin layer evaporator comprising a container forming a body, a drive shaft projecting into the same from one front face thereof and a rotor fixed thereto having one or more conically outwardly widening evaporator areas and whose evaporator chamber is connected to the body and a heating chamber separated from the body, the starting product being charged at the inner periphery of the evaporator areas, spreads outwards from there in film-like manner and the concentrate is removed from the outer periphery by means of a draw-off pipe.

Thin layer evaporators of the aforementioned type are known (British Pat. No. 1 132 640, Swedish Pat. No. 184 175) or form the subject matter of an earlier-dated U.S patent application Ser. No. 688,411, filed Jan. 2, 1985. In these evaporators, evaporator areas generally slope conically, either in the same direction so that they are roughly parallel to one another, or directed oppositely to one another, so that the corrugated tube with a similar construction is obtained. These evaporators can be operated in single stage or multistage manner, so that the starting product is either supplied simultaneously to all the evaporator areas (single stage), or to only part of the evaporator areas (multistage), the concentrate being removed by means of a draw-off pipe and transferred to the other evaporator areas.

In the case of these thin layer evaporators, the front face of the rotor is located on the drive shaft, which has to absorb all the forces. The support structure of the rotor must be constructed in a corresponding stable manner, in order to be able to absorb the dynamic forces. This more particularly applies if the evaporator is positioned horizontally, when the gravity of the rotor acts at right angles to the drive shaft. As all the forces have to be passed to the outside via the drive shaft, a correspondingly complicated bearing is required outside the container and this leads to additional construction height or, in the case of a horizontal arrangement, construction length.

SUMMARY OF THE INVENTION

The problem of the invention is to so construct a thin layer evaporator of the aforementioned type that the dynamic forces can be absorbed in a simple constructional manner and the evaporator can be operated as vibration-free as possible.

On the basis of the aforementioned evaporator, this problem is solved in that the drive shaft is at least partly constructed as a hollow shaft and is mounted on a fixed spindle projecting into the container and the rotor.

In the case of the inventive construction of the thin layer evaporator, the spindle forms a central support structure for the rotor, which absorbs all the radial and/or centrifugal forces. The fixed spindle can be dimensioned in such a way that its support structure is short outside the container, so that construction height or length can be economized. The strength advantages of this come to bear both in the case of vertical and horizontal positioning of the evaporator, but particularly in the latter case offer the possibility of arranging a plurality of evaporator areas in axially succeeding manner and so permit vibration-free operation with high evaporator efficiency and/or a large mass flow rate.

A particularly good dynamic stability is obtained according to an embodiment if the spindle extends roughly over the axial length of the rotor into the container.

The inventive construction of the thin layer evaporator also provides the possibility of constructing the drive shaft at least in two-part form and to interconnect the two shaft parts by means of a disengaging coupling or clutch, the rotor being connected to a hollow shaft part.

Whereas in the case of the known thin layer evaporators, the rotor is arranged in unsupported manner within the container, and consequently it is very difficult to obtain access to the evaporator from the drive side, in the case of the construction according to the invention it is carried by the spindle via the hollow shaft. If the drive shaft is constructed in two-part manner, the evaporator container can be opened on the drive side, one shaft part being detached from the other shaft part in the vicinity of the coupling. The rotor remaining in the container can consequently be inspected from the drive side and can in particular be cleaned. This is more particularly important in the case of those thin layer evaporators requiring aseptic cleaning.

According to an embodiment of the invention, a continuous support structure for the rotor can be obtained in that the spindle is introduced into the container from one front face and the drive shaft from the opposite front face. The drive shaft remains largely free from transverse forces, because the latter are absorbed by the hollow shaft and transferred to the spindle.

In the case of this embodiment, the driven shaft part can be constructed as a solid shaft whilst the other shaft part connected to the rotor can be constructed as a hollow shaft part and the coupling is arranged on the frontal termination or closure of the hollow shaft part. Thus, the drive shaft can be separated in the coupling positioned there.

According to another embodiment, the driven shaft part can comprise two solid shaft parts, whereof one together with the drive motor is fixed on the front face of the container and is connected via the coupling with the second solid shaft part, which is in turn supported in a bearing on said front face. Thus, the disengaging coupling can also be positioned outside the container.

If, in per se known manner, the container has a closable cover on one front face with a drive motor and the drive shaft for the rotor fixed thereto, according to the invention the cover, together with the drive motor and the driven shaft part can be opened by pivoting or axial displacement, whilst disengaging the coupling with the other shaft part. For this purpose, in the simplest manner the coupling is constructed as a pin or splined coupling, so that no further manipulations than have hitherto been required are necessary for opening the container, and easy access for cleaning purposes are possible to the rotor and/or evaporator areas.

According to another advantageous embodiment, the spindle is constructed as a hollow spindle, through which is passed part of the drive shaft and on whose outside is mounted the part constructed as a hollow shaft, the two shaft parts being connected by a flange engaging over the front face of the hollow spindle.

This construction makes it possible to introduce the hollow spindle into the container from the front face opposite to the container cover so that the complete supporting and drive structure in no way impedes the opening or closing of the cover and consequently the cleaning of the evaporator areas.

In the case of this embodiment, the drive motor is advantageously positioned on the front face of the hollow spindle located outside the container, the drive shaft is constructed in two-part manner and the coupling is arranged between the two parts as well as between the drive motor and the external front face of the hollow axis.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
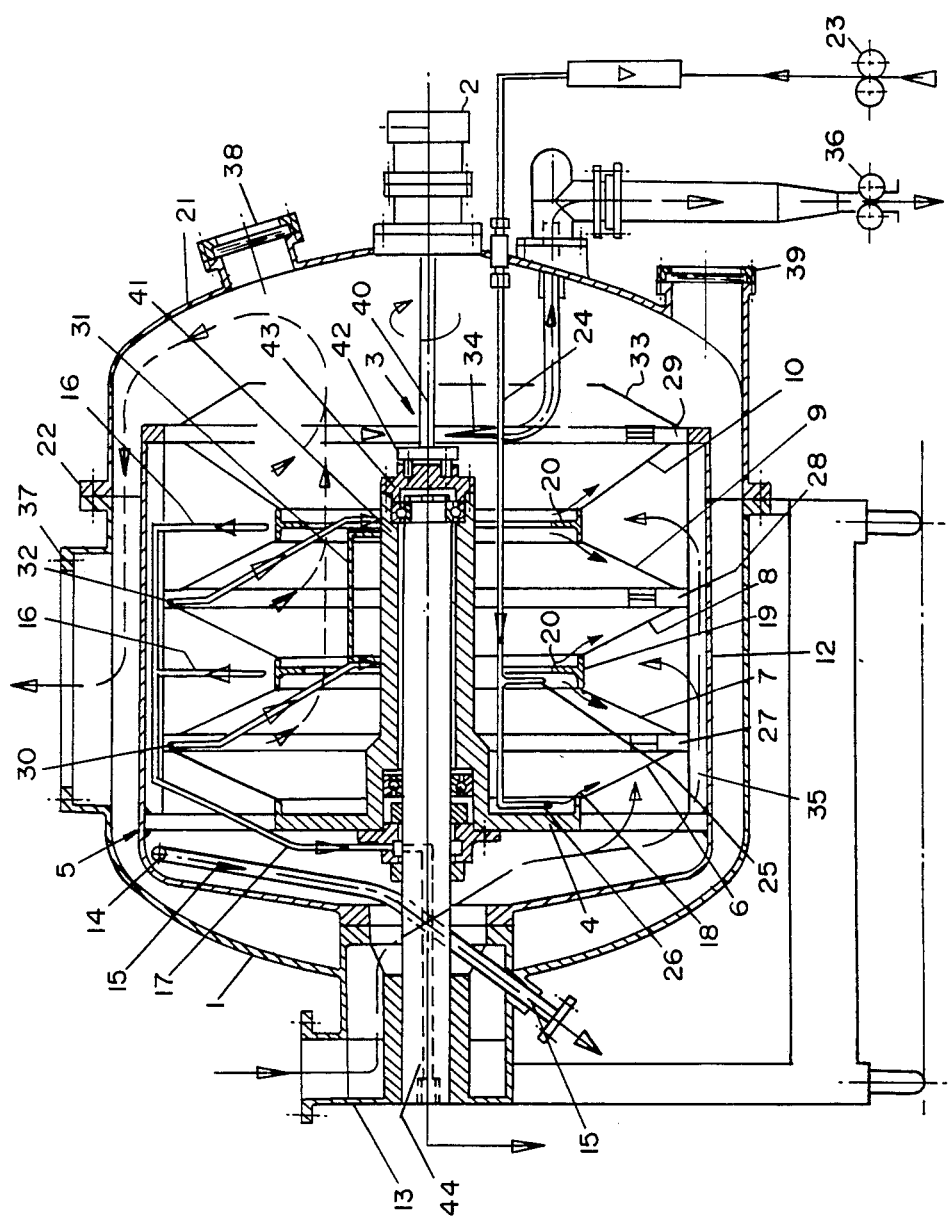
FIG. 1 a longitudinal section through a horizontally arranged, multistage evaporator, with an embodiment of the drive.
Figure 2:
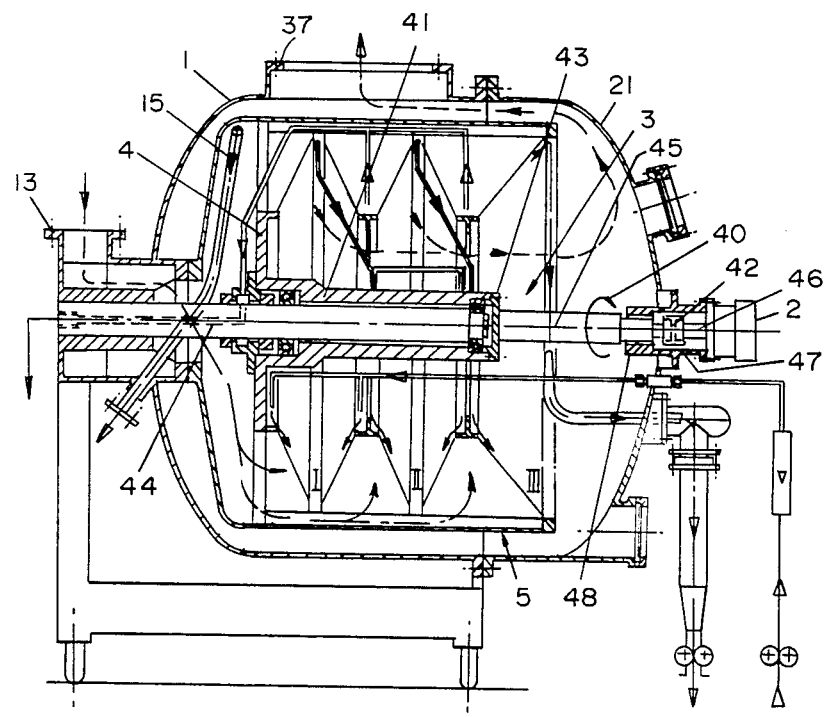
FIG. 2 the evaporator according to FIG. 1 with another embodiment of the drive.

The thin layer evaporator according to FIGS. 1 and 2 is positioned horizontally and has a closed container 1, on whose one frontal closure is placed a cover 21 with marginal flange 22 and a continuously variable hydraulic drive 2. The drive shaft 3 rotated by the latter has at one end a support flange 4, to which is fixed the complete rotor 5. The rotor comprises a plurality of conical evaporator areas 6, 7, 8, 9, 10, which are arranged in juxtaposed manner, as well as a cylindrical jacket 12, which spacedly externally surrounds the same and which encloses a heating chamber between itself and the outside of the evaporator areas 6 to 10. On their outer periphery, the evaporator areas are connected to jacket 12 by means of strips 35. The heat carrier, e.g. steam, is supplied by means of a pipe connection 13 to the front face of container 1 facing hydraulic drive 2 and flows into the heating chamber, flowing round the outside of the evaporator areas 6 to 10 in accordance with the arrows. The condensate produced is displaced outwards as a result of the centrifugal action and is removed on the inner circumference of jacket 12 by a skimming tube 14 and is led to the outside by means of a condensate pump via a line 15. Vent pipes 16 are provided between in each case two adjacent evaporator areas 7, 8 or 8, 9 or 9, 10, to be able to remove gas collecting at the bottom thereof. These vent pipes 16 are connected via a collecting line 17 to the condensate pump, which removes condensate and separated gases.

On their inner periphery, the evaporator areas 6 to 10 are in each case connected to overflow profiles, overprofile 18 at one end of the evaporator chamber being constructed as a simple web plate, whereas the other overflow profiles 19 in each case comprise an annular T-profile with a central wall web 20.

By means of a pump 23 and a line 24, the product is fed into the rotor 5. For this purpose, line 24 is led into the free inner area of the rotor, and ends in the case of the reproduced embodiment in two discharge openings 25, 26, discharge opening 26 being associated with the web-like overflow profile 18 and discharge opening 25 with the first T-shaped overflow profile 19. Thus, in this embodiment, the evaporator areas 6 and 7 form a first evaporator stage I, in which the starting product is concentrated.

The externally assembled evaporator areas 6, 7 or 8, 9 in each case form a collecting channel 27, 28, 29. A draw-off pipe 30 is introduced into collecting channel 27 of the first evaporator stage in the vicinity of the apex thereof, and takes up the concentrated products and transfers them via a distributing pipe 31 with two not shown discharge openings into the overflow profile of the second evaporator stage II associated with the evaporator areas 8, 9. The concentrated product spreads in film-like manner over the evaporator areas 8, 9 and finally drops in high concentration into the collecting channel 28, where once again a draw-off pipe 32 is provided, which transfers the further concentrated produce into the part of overflow profile 19 of evaporator area 10 to the right of wall web 20 forming the third evaporator stage III. The product which is then concentrated for the third time flows together into the collecting channel 29, which once again contains a draw-off pipe 34 which skims the end concentrate which is removed from the evaporator by means of a pump 36. Evaporator stage III is covered towards the body by means of a splash shield 33.

The interior of rotor 5 is linked with the area of the container 1, so that the vapours produced during concentration can be removed via a pipe connection 37 in accordance with the indicated arrows. For reasons of completeness, it is pointed out that the container 1 also has sight glass openings 38, 39 for inspecting the evaporator.

The drive shaft 3 of the rotor is constructed in two-part manner. In the case of the reproduced embodiment, it comprises a solid shaft 40 and a shaft part constructed as a hollow shaft 41. Shaft part 40 is directly driven by hydraulic motor 2 and is connected via an axially disengageable coupling 42, e.g. a pin coupling to the hollow shaft part 41. In the vicinity of the coupling, the latter has a frontal closure 43, which simultaneously forms one of the two coupling parts of the pin coupling. At the opposite end, hollow shaft part 41 has the support flange 4 for rotor 5. The hollow shaft part 41 is mounted on a fixed spindle 44, which extends roughly over the length of rotor 5 and is fixed to the pipe connection 13 of container 1.

For cleaning, particularly the evaporator areas of the rotor, cover 21 with its flange 22 can be detached from the jacket of container 1 and moved away axially. Pin coupling 42 is automatically disengaged, so that the subassembly formed by cover 21, hydraulic motor 2 and shaft part 40 can be completely released, so that the rotor is accessible from the cover side. The installation fixed to the cover 21 and comprising the product line 24 and the draw-off pipe 34 can be constructed and arranged in such a way that they can be dismantled, or can follow the axial movement of the cover.

The embodiment of FIG. 2 differs from that according to FIG. 1 only in that the solid shaft 40 is constructed in two parts, namely a part 45 within container 1 and a part 46 forming the driven shaft of hydraulic drive 2, the pin coupling 42 being arranged between these two shaft parts within a hollow cylindrical attachment 47 on cover 21. Cover 21 also carries a step bearing 48 for the shaft part in container 1. This shaft part 45 is connected to shaft part 41 via a flange 49.

Figure 3:
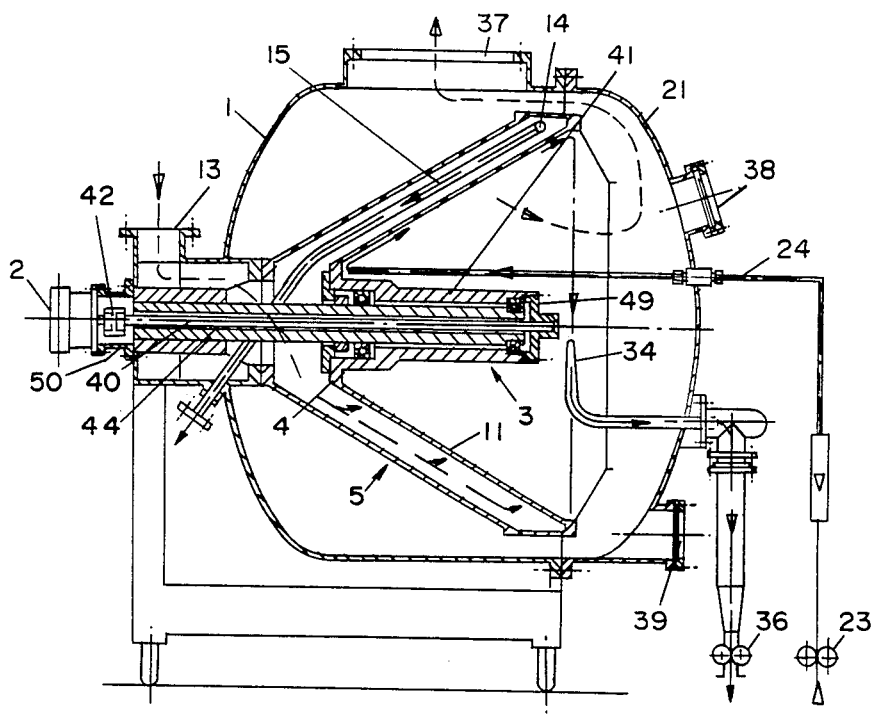
FIG. 3 an evaporator with only one evaporator area and a further embodiment of the drive.

FIG. 3 shows an embodiment of an evaporator which differs from that according to FIGS. 1 and 2 in that the rotor 5 is constructed as a conical double jacket defining the heating chambers and only has a single evaporator area 11. In addition, spindle 44 is constructed as a hollow spindle and, as in the aforementioned embodiments, is supported on the side opposite to cover 21 outside container 1. The solid shaft 40 introduced from the same front face of container 1 is located within the hollow spindle 44 and projects somewhat beyond the front face of the hollow spindle 44 located within container 1, where it is provided with a flange 49, to which is fixed the hollow shaft 41, which is in turn mounted on the outside of hollow spindle 44. At its front face opposite to flange 49, hollow shaft 41 forms the support flange 4 for rotor 5. As in the embodiment according to FIG. 2, pin coupling 42 is positioned outside container 1, but in this case on the front face opposite cover 21. It is once again located in a hollow cylindrical attachment 50, which projects from the outside front face of hollow spindle 44. The pin coupling 42 connects the driven shaft of the hydraulic drive 2 to the solid shaft 40. In this embodiment, the evaporator area 11 is accessible after releasing the cover 21, without any changes being necessary on the drive and support structure.

What is claimed is:

1. In a thin layer evaporator having a container, a removable container cover, a drive shaft projecting into the container, a rotor fixed to the drive shaft and having a conical outwardly spreading evaporator surface defining an inwardly lying evaporator chamber, a heating chamber separated from the evaporator chamber, means for discharging liquid to be evaporated at the inner periphery of the conical evaporator surface of the rotor for spreading the liquid in a thin film outwardly therefrom over the conical surface toward the outer periphery of the evaporator surface and means including a draw-off pipe for removing the resulting concentrated liquid from the outer periphery of the evaporator surface, the improvement comprising: the removable container cover being disposed at the one side of the container and the drive shaft projecting into the container from the opposite side, a stationary hollow spindle (44) projecting into the container and the rotor (5) from said opposite side of the container, the drive shaft being formed in two parts, the first part (40) extending through the hollow spindle, and the second part including a hollow shaft (41) rotatably mounted on the outside of the hollow spindle and connected at one end with the first part (40) of the drive shaft within the spindle by means of an interconnecting flange (49) and at the other end (4) with the rotor whereby the container cover can be removed for inspection of the evaporator surfaces without structural disassembly of the rotor.

2. A thin layer evaporator as defined in claim 1 wherein a drive motor (2) is mounted on said opposite side of the container outside of the container, and a coupling (42) is interposed between the drive motor (2) and the first part of the drive shaft (40) projecting through the hollow spindle.

* * * * *